US008488881B2

(12) United States Patent
Feris et al.

(10) Patent No.: US 8,488,881 B2
(45) Date of Patent: Jul. 16, 2013

(54) OBJECT SEGMENTATION AT A SELF-CHECKOUT

(75) Inventors: Rogerio S. Feris, White Plains, NY (US); Charles A. Otto, Lansing, MI (US); Sharathchandra Pankanti, Norwalk, CT (US); Duan D. Tran, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/844,340

(22) Filed: Jul. 27, 2010

(65) Prior Publication Data
US 2012/0027297 A1 Feb. 2, 2012

(51) Int. Cl.
G06T 7/0081 (2006.01)

(52) U.S. Cl.
USPC .............. 382/173; 382/164; 382/190

(58) Field of Classification Search
USPC ............. 382/110, 173, 103, 164, 128, 190, 382/199, 305; 358/403, 1.15; 424/277.1; 705/400; 356/326, 328; 235/383
See application file for complete search history.

(56) References Cited

U.S. PATENT DOCUMENTS

| 5,497,314 | A | 3/1996 | Novak | |
|---|---|---|---|---|
| 6,142,375 | A | 11/2000 | Belka et al. | |
| 6,236,736 | B1 * | 5/2001 | Crabtree et al. | 382/103 |
| 6,363,366 | B1 * | 3/2002 | Henty | 705/400 |
| 6,661,918 | B1 * | 12/2003 | Gordon et al. | 382/173 |
| 7,034,679 | B2 | 4/2006 | Flynn | |
| 7,317,830 | B1 * | 1/2008 | Gordon et al. | 382/173 |
| 7,319,990 | B1 * | 1/2008 | Henty | 705/400 |
| 7,337,960 | B2 | 3/2008 | Ostrowski et al. | |
| 7,422,147 | B2 | 9/2008 | Rosenbaum | |
| 7,894,675 | B2 * | 2/2011 | Wiedemann et al. | 382/199 |
| 2004/0128512 | A1 | 7/2004 | Sharma et al. | |
| 2005/0256807 | A1 | 11/2005 | Brewington | |
| 2008/0027817 | A1 | 1/2008 | Iizaka et al. | |
| 2009/0026270 | A1 | 1/2009 | Connell, II et al. | |

OTHER PUBLICATIONS

Burke, G. High Performance Optical Sensing System for Reading Bar Code. IPCOM00008I777D, Feb. 28, 2005.
The Item Verification-Security System for all Retailers. IPCOM000139267D, Aug. 17, 2006.
Cheng et al. Automatic image annotation retrieval system. WSEAS Transactions on Communications ( WSEAS Trans. Commun. ) (Greece) 2006 5/6 (984991).

* cited by examiner

Primary Examiner — Anh Do
(74) Attorney, Agent, or Firm — Ryan, Mason & Lewis, LLP

(57) ABSTRACT

Techniques are provided. The techniques include capturing an image of an object at a self-checkout, dividing the image into one or more blocks, computing one or more features of the image, computing a confidence value for each of the one or more blocks, wherein computing a confidence value for each of the one or more blocks comprises using a minimum feature distance from one or more reference background blocks, and eliminating one or more blocks from consideration via use of an adaptive threshold computed on the confidence value for each of the one or more blocks, wherein the one or more blocks remaining map to a region of the image containing the object.

25 Claims, 4 Drawing Sheets

OBJECT SEGMENTATION AT A SELF-CHECKOUT

FIELD OF THE INVENTION

Embodiments of the invention generally relate to information technology, and, more particularly, to video surveillance.

BACKGROUND OF THE INVENTION

A challenge faced by commercial and retail enterprises is ticket-switching at a self checkout. That is, a shopper may tamper the barcode on an item to his/her advantage. Part of the challenge lies in the attempt to verify the item identity claim in such scenarios. Segmenting the objects from the background is a necessary for the product verification process. However, existing segmentation systems based on background subtraction suffer from lighting changes, camera noise, and the lack of long-term background modeling, which can cause erroneous segmentations.

SUMMARY OF THE INVENTION

Principles and embodiments of the invention provide techniques for object segmentation at a self-checkout. An exemplary method (which may be computer-implemented) for segmenting an object at a self-checkout, according to one aspect of the invention, can include steps of capturing an image of an object at a self-checkout, dividing the image into one or more blocks, computing one or more features of the image, computing a confidence value for each of the one or more blocks, wherein computing a confidence value for each of the one or more blocks comprises using a minimum feature distance from one or more reference background blocks, and eliminating one or more blocks from consideration via use of an adaptive threshold computed on the confidence value for each of the one or more blocks, wherein the one or more blocks remaining map to a region of the image containing the object.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
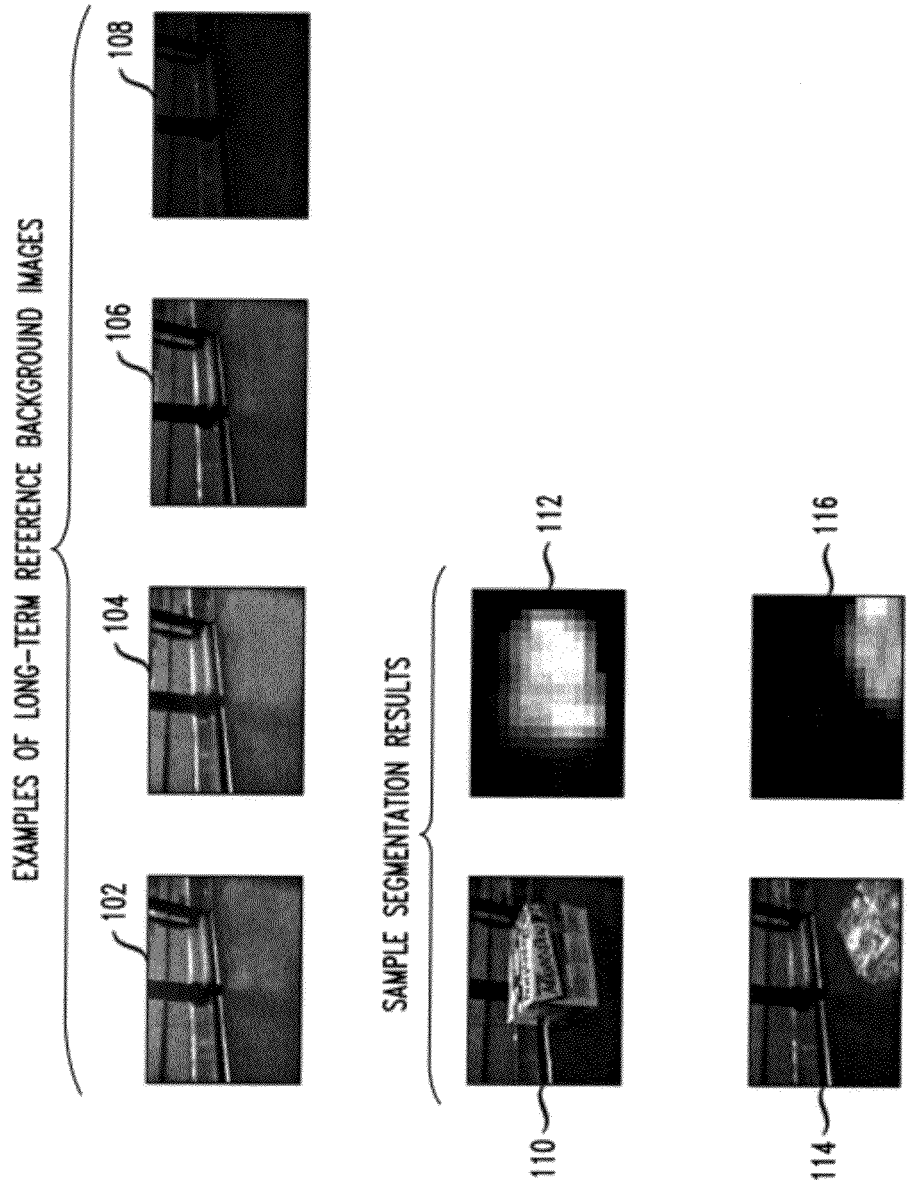
FIG. 1 is a diagram illustrating example background images and segmentation results, according to an embodiment of the present invention.

Principles of the invention include object segmentation in self-checkout systems. One or more embodiments of the invention include using computer vision techniques for segmentation of objects in self-checkout systems to, for example, prevent the ticket switching fraud in self-checkout (for example, individuals attempting to exchange the barcode of expensive items with barcodes of cheap products). As detailed herein, one or more embodiments of the invention use cameras to look at the products or objects being handled by a customer at a self-checkout and use computer vision algorithms to verify the claimed identity of those product. As such, the segmentation of the objects from the background can be achieved.

One or more embodiments of the invention include segmenting an object (that is, finding the region of the image containing the object), extracting features from the region describing the object, and comparing the extracted features with features known to belong to the claimed identity of the object. With respect to extracting features describing the image, one or more embodiments of the invention include using color histograms. Also, as further described herein, a feature can include anything that describes an image (or region of an image), and there are any number of different possible feature types.

As described herein, an image captured by a camera is segmented into blocks so that certain features can be extracted from the image to verify their identity. One or more embodiments of the invention system can also store a number of background images divided into blocks such that when a new image is captured, background noise can be removed from the image to achieve a more accurate comparison. Hence, and as further detailed herein, one or more embodiments of the invention can include using a specific visual object segmentation algorithm based on background subtraction wherein confidence scores of image blocks are calculated and blocks with confidence scores below an adaptively computed threshold are eliminated in order to reduce erroneous segmentation.

One or more embodiments of the invention include maintaining a set of long-term background reference images covering variations such as, for example, lighting, shadows, etc. Instead of processing pixels in these images, one or more embodiments of the invention include dividing the images into a set of blocks (for example, a 16×16 block) and extracting features (such as scale-invariant feature transform (SIFT) descriptors, texture measures, etc.) for each bock.

By way of illustration, suppose, for example, there is a new image containing a product. One or more embodiments of the invention would include dividing the image into blocks (for example, non-overlapping blocks) and extracting features. Then, for each block, one or more embodiments of the invention include computing the confidence of the block belonging to the product (and not to the background) by taking the minimum feature distance to all blocks in the reference background images at the same location. Accordingly, one or more embodiments of the invention include assuming that the minimum feature distance from a block on the input image to a block in a background image is proportional to the probability that the block belongs to the foreground (that is, the more different a block is from the background, the more likely it is that the block belongs to the object that the techniques detailed herein are trying to segment, and not the background).

Processing blocks (instead of, for example, pixels) is useful in dealing with noise. By keeping reference background images over different time periods, one or more embodiments of the invention can maintain a long-term model of the background. The final confidence for each image block can be used to weight color histograms and improve classification results.

One or more embodiments of the invention include using histograms based on the hue, saturation, intensity (HSI) color space to describe the distribution of colors within a segmented region. Accordingly, three histograms are established: one for hue values, one for intensity values, and one for saturation values. Each bin of a histogram corresponds to a range of possible values for hue, saturation or intensity. One or more embodiments of the invention can include visiting each pixel in the segmented region, then calculating the pixel's hue, saturation, and intensity and incrementing the corresponding bins in the three histograms. The histograms can also be normalized by dividing each value by the total of all bins so that the histograms describe the relative frequency of their values.

In using segmentation confidence values with color histograms, one or more embodiments of the invention can include making the following adjustment to the above procedure. After calculating the HSI values for a pixel, the minimum background-block distance is added for the block the pixel falls to in the histogram bins, rather than just adding 1. This means that blocks with a low segmentation confidence have less influence on the ultimate feature vector, and blocks with high segmentation confidence have more influence. Higher classification accuracy can result from using this weighted color histogram calculation as compared to calculating color histograms normally. Also, the classification attempting to be made in one or more embodiments of the invention can be, for example, "Does the object in this image match the barcode scanned for the object?" Consequently, one or more embodiments of the invention include incorporating knowledge about the quality of segmentation in a block (for example, the minimum background-block distance) and giving blocks of the image more or less influence on the classification result based on their segmentation quality.

One or more embodiments of the invention can subsequently iteratively eliminate blocks (for example, those with small confidence values) by adaptive thresholds computed on current block confidence scores. Blocks falling below the threshold are automatically eliminated. Further, as used in this context, eliminated means "considered part of the background, and not part of the object being segmented." The final set of blocks (for example, those above a certain confidence threshold) defines the regions of the image containing the object.

As described herein, each block corresponds to a region of the image, and for each block, one or more embodiments of the invention attempt to decide whether or not that region of the image is part of the background. The set of blocks that are not eliminated are the regions of the image containing the object being segmented, and not the background.

Accordingly, one or more embodiments of the invention include detecting fraudulent transactions by validating the claimed identity of an object during checkout. Additionally, one or more embodiments of the invention include the ability to cope with challenges caused by uncontrolled illumination and pose observed on an open checkout lane. As detailed herein, processing blocks is beneficial in terms of compensating for camera noise. Also, one or more embodiments of the invention include improving segmentation results by using multiple background images taken at different times (that is, a long-term background model). Blocks are matched to the corresponding positions in multiple background images and the minimum distance is taken for each block. Blocks of the input image are matched to the background independently of each other, so the closest matching background image for two different blocks of the input image may be different. For example, if something is casting a shadow over part of the lane in the input image, the shadowed blocks of the input image can match a darker background image, while the non-shadowed blocks can match a lighter background image. Consequently, using multiple background images in this way provides a degree of robustness to changes in lighting conditions.

Further, security for more traditional self-checkout lanes with conveyor belts can be enhanced via implementation of one or more embodiments of the invention. Accordingly, images of objects can be captured as they move across an open conveyor belt, and the object can be accurately located in the background.

FIG. 1 is a diagram illustrating example background images and segmentation results, according to an embodiment of the present invention. By way of illustration, FIG. 1 depicts examples of long-term reference background images 102, 104, 106 and 108. By way of example, images 102, 104, 106, and 108 were taken at different times on different days and show some of the variation present in the background (for example, 108 is significantly darker than 102 due to the varying amount of light present in the store throughout the course of the day).

Also, FIG. 1 depicts sample segmentation results 110, 112, 114 and 116. Images 112 and 116 show thresholded confidence maps. Blocks that fell below the threshold are colored black on the image, while blocks above threshold are colored gray to white, with lighter blocks corresponding to higher confidence scores.

Figure 2:
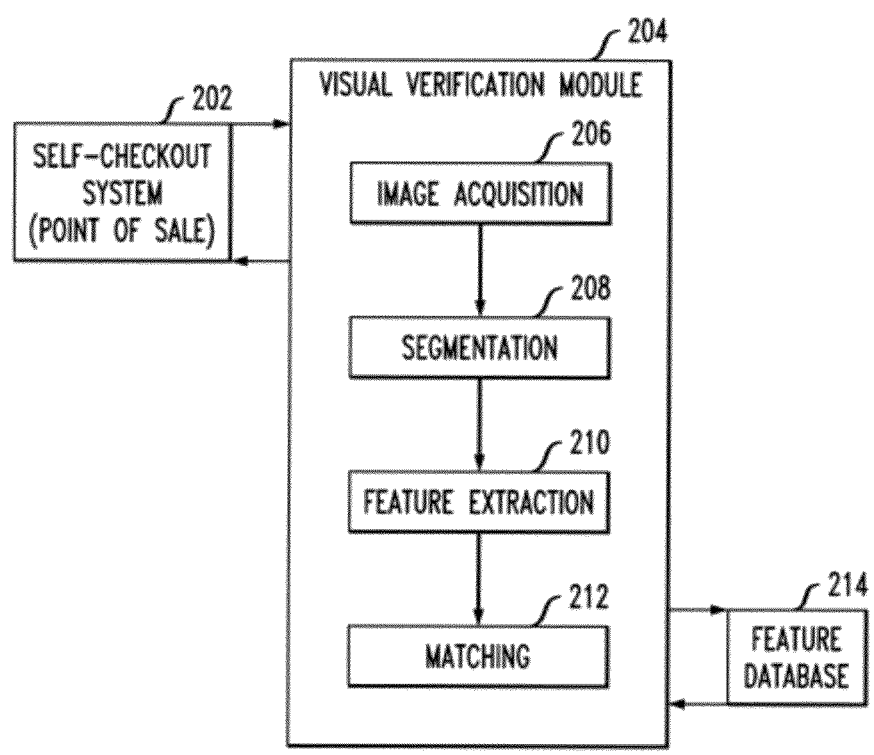
FIG. 2 is a block diagram illustrating an exemplary embodiment, according to an aspect of the invention.

FIG. 2 is a block diagram illustrating an exemplary embodiment, according to an aspect of the invention. By way of illustration, FIG. 2 depicts a self-checkout system (or point of sale) 202, which provides input to the visual verification module 204. As depicted in FIG. 2, the visual verification module 204 contains image acquisition module 206, segmentation module 208, feature extraction module 210 and matching module 212. FIG. 2 also depicts a feature database 214.

By way of example and not limitation, an implementation of one or more embodiments of the invention can include the following. A user scans an item (for example, at self-checkout system 202) and then places that item on the belt. The barcode read for the item is passed to visual verification module 204, and features corresponding to that barcode are looked up in a centrally located database (for example, feature database 214). An image of the item is acquired (for example, via image acquisition module 206) as it travels down the belt, and the raw image is passed to segmentation module 208, which will find the location of the item in the image using techniques as described herein (for example, breaking the image into blocks, comparing each block with corresponding blocks from a group of background images, etc.).

The segmented image containing just the object is passed to feature extraction module 210, which extracts a description of the segmented region (for example, weighted color histograms). The extracted features are compared with features known to belong to the barcode that was looked up in the database. The verification module 204 then returns a yes/no decision (via matching module 212) to the larger self-checkout system indicating whether or not the image matches the object's claimed identity.

Figure 3:
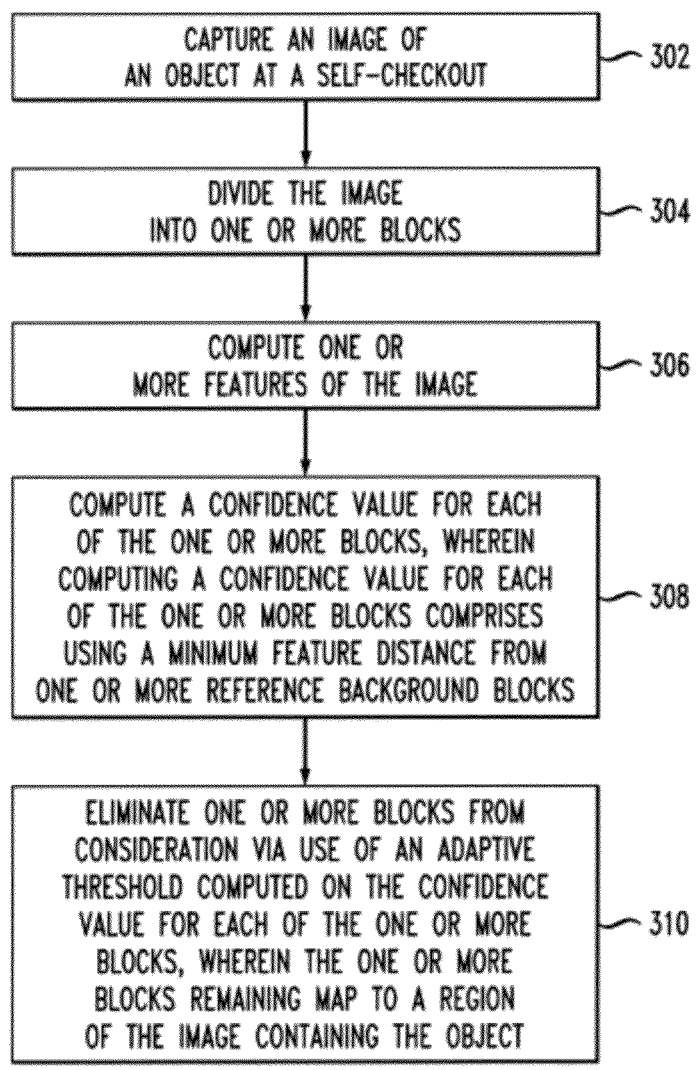
FIG. 3 is a flow diagram illustrating techniques for segmenting an object at a self-checkout, according to an embodiment of the invention.

FIG. 3 is a flow diagram illustrating techniques for segmenting an object at a self-checkout, according to an embodiment of the present invention. The techniques outlined in FIG. 3 depict a visual object segmentation algorithm, that is, an algorithm for finding a region of interest in an image. Step 302 includes capturing an image of an object at a self-checkout. This step can be carried out, for example, using an image acquisition module. Capturing an image of an object at a self-checkout can include, for example, capturing, via a camera, an image of an object as it moves across an open conveyor belt of a self-checkout.

Step 304 includes dividing the image into one or more blocks. This step can be carried out, for example, using a segmentation module. As described herein, one or more embodiments of the invention include dividing the image up into a grid with fixed-size rows and columns, with a block being one cell of this grid. (See, for example, images 112 and 116 in FIG. 1; the distinct squares are the cells of the grid ("blocks").) The size of the grid (rows and columns) can depend on the resolution of images acquired and the distance from the camera to the lane. An example embodiments of the invention included using blocks of size 16×16 pixels (working with 320×240 pixel images our grid had 20 columns and 15 rows).

Step 306 includes computing one or more features of the image (for example, a histogram). This step can be carried out, for example, using a segmentation module. In step 306, features describing a block are being extracted (and in step 308, those features are being compared to features describing the corresponding blocks in several background images). Additionally, the feature extraction module (depicted as module 210 in FIG. 2) can extract features for each block in the segmented region, or extract features describing the segmented region as a whole (in the case of color histograms, for example, the segmented region as a whole is being described). The features extracted by module 210 (after segmentation has been completed) are compared to features extracted from other products.

Step 308 includes computing a confidence value for each of the one or more blocks, wherein computing a confidence value for each of the one or more blocks comprises using a minimum feature distance from one or more reference background blocks. This step can be carried out, for example, using a segmentation module. As detailed herein, one or more embodiments of the invention include using the minimum distance from the features describing a block to features describing the corresponding block extracted from a number of background images.

Step 310 includes eliminating (for example, iteratively) one or more blocks from consideration via use of an adaptive threshold computed on the confidence value for each of the one or more blocks, wherein the one or more blocks remaining map to a region of the image containing the object. This step can be carried out, for example, using a segmentation module. One or more embodiments of the invention can also include using the confidence value of each block to weight a color histogram used for object classification.

As described herein, one or more embodiments of the invention include computing color histograms by calculating HSI values in a region and counting how many fall within each histogram bin. For a given pixel, one or more embodiments of the invention would therefore add 1 to the bins the histogram's hue, saturation, and intensity values fell in. Confidence values are taken into account by increasing the histogram bins by the confidence value (the minimum distance to background block, as described herein) rather than increasing the bins by for each pixel. Accordingly, for a given pixel, one or more embodiments of the invention include adding the distance for the block containing that pixel to the appropriate histogram bins, instead of adding 1. Consequently, blocks with higher confidence values have a larger influence on the distribution of values in the histograms because they have a larger "vote," or share of the input.

The techniques depicted in FIG. 3 can additionally include creating and maintaining a set of one or more reference background images (for example, in a database). The background reference images can cover, for example, one or more visual variations of the self-checkout (such as, for example, lighting, shadows, etc.), as well as cover multiple time periods. One or more embodiments of the invention can also include dividing each reference background image into a set of one or more non-overlapping blocks, and extracting one or more features (SIFT, etc.) from each of the one or more non-overlapping blocks.

Further, the techniques depicted in FIG. 3 include reading a barcode for the object at the self-checkout, and using a database to identify one or more known features corresponding to the barcode. Additionally, one or more embodiments of the invention include comparing the one or more computed features of the image with the one or more known features corresponding to the barcode to determine whether or not the image matches the object's barcode identity.

By way of illustration and not limitation, one or more embodiments can include a sequence such as the following example. Features, as described herein, typically have the form of a vector of numbers (for example, the values in the bins of color histograms form a vector of numbers). Given two vectors of numbers one or more embodiments of the invention can include using a distance metric such as, for example, Euclidean distance or Manhattan distance, to calculate a distance between them. This distance is a measure of the vectors' dissimilarity.

Additionally, one or more embodiments of the invention include acquiring a set of background images, and extracting features describing blocks arranged in a grid in those background images. Given an input image, one or more embodiments of the invention include extracting features describing each block of the input image. For each block of the input image, a distance is computed from the features describing that block to the features describing the block at the same position of each background image. One or more embodiments of the invention include taking the smallest of those distances as the "minimum block to background block distance" for that input block. This minimum distance is used directly as a "confidence value" for that block. The distance is a measure of how dissimilar the input block is to the corresponding block in the background images, and it is used as a measure of the level confidence that the block does not in fact belong to the background (one or more embodiments of the invention also include assuming a higher distance implies a higher probability that the input block belongs to the object not the background).

The techniques depicted in FIG. 3 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a visual verification module, an image acquisition module, a segmentation module, a feature extraction module, and a matching module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
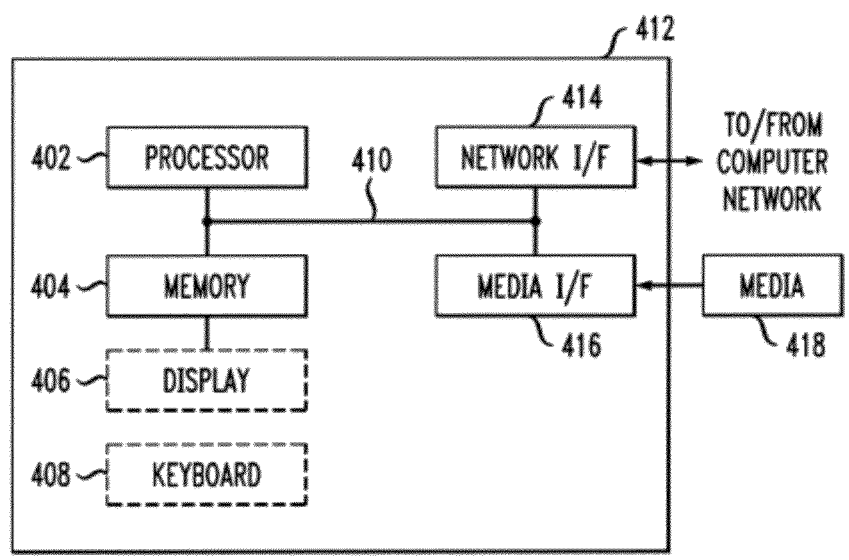
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term in "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, using a specific visual object segmentation algorithm based on background subtraction wherein confidence scores of image blocks are calculated and blocks with confidence scores below a adaptively computed threshold are eliminated in order to reduce erroneous segmentation.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for segmenting an object at a self-checkout, wherein the method comprises:
    capturing an image of an object at a self-checkout, said capturing carried out by a distinct module executing on a hardware processor;
    dividing the image into one or more blocks, said dividing carried out by a distinct module executing on a hardware processor;
    computing one or more features of the image, said computing carried out by a distinct module executing on a hardware processor;
    computing a confidence value for each of the one or more blocks, wherein computing a confidence value for each of the one or more blocks comprises using a minimum feature distance from one or more reference background blocks, said computing carried out by a distinct module executing on a hardware processor; and
    eliminating one or more blocks from consideration via use of an adaptive threshold computed on the confidence value for each of the one or more blocks, wherein the one or more blocks remaining map to a region of the image containing the object, said eliminating carried out by a distinct module executing on a hardware processor.

2. The method of claim 1, further comprising:
    reading a barcode for the object at the self-checkout; and
    using a database to identify one or more known features corresponding to the barcode.

3. The method of claim 2, further comprising comparing the one or more computed features of the image with the one or more known features corresponding to the barcode to determine whether or not the image matches the object's barcode identity.

4. The method of claim 1, further comprising creating and maintaining a set of one or more reference background images.

5. The method of claim 4, wherein the set of one or more background reference images cover one or more visual variations of the self-checkout.

6. The method of claim 4, wherein creating and maintaining a set of one or more reference background images comprises creating and maintaining a set of one or more reference background images over two or more different time periods.

7. The method of claim 4, further comprising dividing each reference background image into a set of one or more non-overlapping blocks.

8. The method of claim 7, further comprising extracting one or more features from each of the one or more non-overlapping blocks.

9. The method of claim 1, further comprising using the confidence value of each block to weight a color histogram used for object classification.

10. The method of claim 1, wherein capturing an image of an object at a self-checkout comprises capturing, via a camera, an image of an object as it moves across an open conveyor belt of a self-checkout.

11. The method of claim 1, wherein eliminating one or more blocks from consideration via use of an adaptive threshold computed on the confidence value for each of the one or more blocks comprises iteratively eliminating one or more blocks from consideration via use of an adaptive threshold computed on the confidence value for each of the one or more blocks.

12. The method of claim 1, wherein the one or more features of the image comprise a histogram.

13. The method of claim 1, further comprising providing a system, wherein the system comprises one or more distinct software modules, each of the one or more distinct software modules being embodied on a tangible computer-readable recordable storage medium, and wherein the one or more distinct software modules comprise an image acquisition module and a segmentation module executing on a hardware processor.

14. A computer program product comprising a tangible computer readable recordable storage device including computer useable program code for segmenting an object at a self-checkout, the computer program product including:
    computer useable program code for capturing an image of an object at a self-checkout;
    computer useable program code for dividing the image into one or more blocks;
    computer useable program code for computing one or more features of the image;
    computer useable program code for computing a confidence value for each of the one or more blocks, wherein computing a confidence value for each of the one or more blocks comprises using a minimum feature distance from one or more reference background blocks; and
    computer useable program code for eliminating one or more blocks from consideration via use of an adaptive threshold computed on the confidence value for each of the one or more blocks, wherein the one or more blocks remaining map to a region of the image containing the object.

15. The computer program product of claim 14, further comprising:
    computer useable program code for reading a barcode for the object at the self-checkout; and
    computer useable program code for using a database to identify one or more known features corresponding to the barcode.

16. The computer program product of claim 15, further comprising computer useable program code for comparing the one or more computed features of the image with the one or more known features corresponding to the barcode to determine whether or not the image matches the object's barcode identity.

17. The computer program product of claim 14, further comprising computer useable program code for creating and maintaining a set of one or more reference background images.

18. The computer program product of claim 17, wherein the computer useable program code for creating and maintaining a set of one or more reference background images comprises computer useable program code for creating and maintaining a set of one or more reference background images over two or more different time periods.

19. The computer program product of claim 14, further comprising computer useable program code for using the confidence value of each block to weight a color histogram used for object classification.

20. A system for segmenting an object at a self-checkout, comprising:
   a memory; and
   at least one processor coupled to the memory and operative to:
      capture an image of an object at a self-checkout;
      divide the image into one or more blocks;
      compute one or more features of the image;
      compute a confidence value for each of the one or more blocks, wherein computing a confidence value for each of the one or more blocks comprises using a minimum feature distance from one or more reference background blocks; and
      eliminate one or more blocks from consideration via use of an adaptive threshold computed on the confidence value for each of the one or more blocks, wherein the one or more blocks remaining map to a region of the image containing the object.

21. The system of claim 20, wherein the at least one processor coupled to the memory is further operative to:
   read a barcode for the object at the self-checkout; and
   use a database to identify one or more known features corresponding to the barcode.

22. The system of claim 21, wherein the at least one processor coupled to the memory is further operative to compare the one or more computed features of the image with the one or more known features corresponding to the barcode to determine whether or not the image matches the object's barcode identity.

23. The system of claim 20, wherein the at least one processor coupled to the memory is further operative to create and maintain a set of one or more reference background images.

24. The system of claim 20, wherein the at least one processor coupled to the memory is further operative to use the confidence value of each block to weight a color histogram used for object classification.

25. An apparatus for segmenting an object at a self-checkout, the apparatus comprising:
   means for capturing an image of an object at a self-checkout;
   means for dividing the image into one or more blocks;
   means for computing one or more features of the image;
   means for computing a confidence value for each of the one or more blocks, wherein computing a confidence value for each of the one or more blocks comprises using a minimum feature distance from one or more reference background blocks; and
   means for eliminating one or more blocks from consideration via use of an adaptive threshold computed on the confidence value for each of the one or more blocks, wherein the one or more blocks remaining map to a region of the image containing the object.

* * * * *